UNITED STATES PATENT OFFICE.

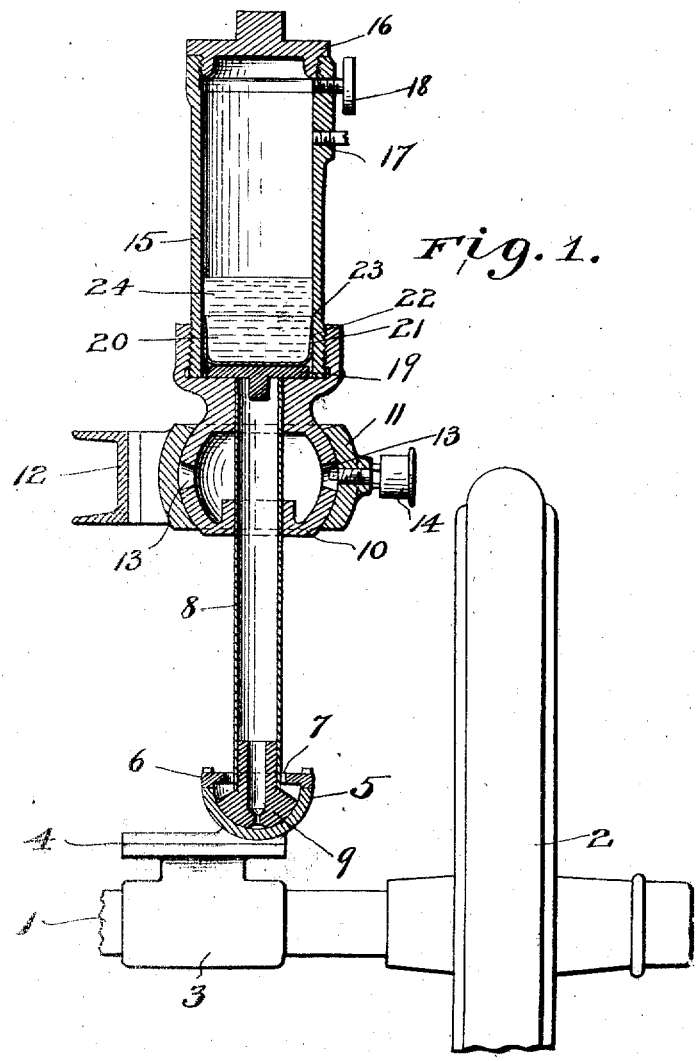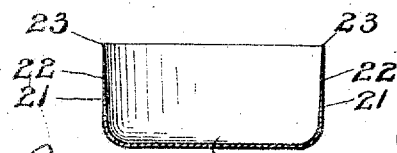

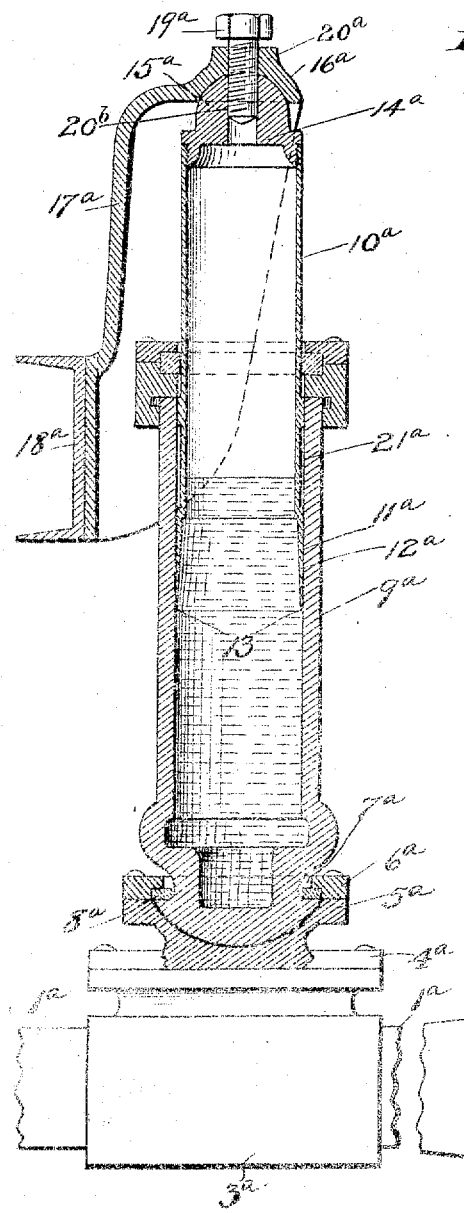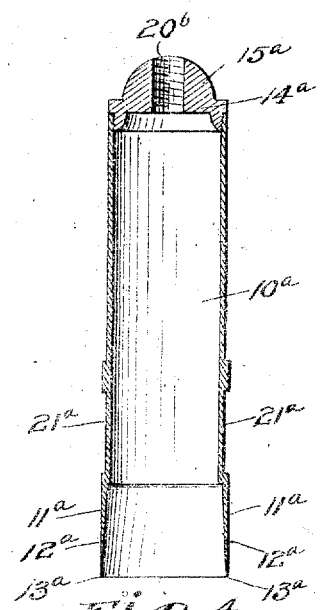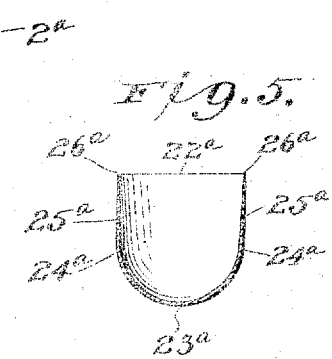

RICHARD LIEBAU, OF WATERVLIET, NEW YORK, ASSIGNOR TO THE WESTINGHOUSE AIR SPRING COMPANY, A CORPORATION OF PENNSYLVANIA.

PNEUMATIC SPRING FOR VEHICLES.

1,046,091.

Specification of Letters Patent.

Patented Dec. 3, 1912.

Application filed January 21, 1908, Serial No. 411,893. Renewed March 9, 1910. Serial No. 548,261.

*To all whom it may concern:*

Be it known that I, RICHARD LIEBAU, a citizen of the United States, residing at Watervliet, in the county of Albany, State of New York, have invented new and useful Improvements in Pneumatic Springs for Vehicles, of which the following is a specification.

My present invention relates to improvements in hydro-pneumatic compression devices of the type in which a compression chamber is used in combination with a movable plunger or piston adapted for relative sliding movement in said chamber to vary the volume and thereby the pressure of an elastic fluid or gas, such as air. In the form shown in the drawing the device is particularly adapted for use as a spring support for vehicles such as automobiles. The success of such a device depends upon the tightness of the sliding joint between the relatively movable members and one of the objects of my present invention is to provide an all-metal sliding joint which is capable of withstanding very high pressures for long periods without leaking. In devices of this kind it has been proposed to accomplish this purpose by means of a metal circumferential wall made very thin at the edge so that such edge may be expanded into contact with the interior of the compression cylinder.

I have discovered that in the above described devices of the prior art the metal edge when made thin enough to be capable of the necessary amount of expansion does not afford a sufficiently wide bearing surface and hence leaks in case of slightest imperfection in workmanship or undue strain upon the device and even when carefully made and operated without side strain the small bearing surface causes the edge to quickly wear away enough metal so that the elasticity is insufficient to maintain tightness of the joints at all points in the periphery.

My present invention consists of an improvement in such devices wherein not only is the extreme edge of the metal packing maintained in contact with the interior wall of the compression chamber, but in addition a relatively wide cylindrical surface in the rear of the edge is also expanded by the pressure into similar intimate contact with the inner wall of the cylinder. I prefer to effect the expansion solely by means of fluid pressure though positive means may be imparted if desired.

By my invention I make the perfectly fitting part of the expanded wall as wide as may be desired so that there is broad surface bearing instead of a narrow edge bearing.

A further feature of my invention consists in forming the thin metal edge above described as part of an integral metal cup filling the entire cross section of the cylinder.

Referring to the drawings:—Figure 1 is a central vertical section. Fig. 2 is a detail section of the piston. Fig. 3 a central vertical section of a modified form of spring. Fig. 4 a detail section of the piston shown in Fig. 3. Fig. 5 is a detail vertical section of another modified form of the piston.

In the drawings in which like numerals of reference denote like parts throughout the several views, 1, represents one end of an axle of a vehicle and 2, a wheel thereon. A sleeve 3, is rigidly secured to the axle and on the top of the sleeve a bracket 4, is seated having a socket 5, preferably semi-spherical in shape, and provided with a cover 6 having a circular hole 7, therethrough.

8, is a hollow piston rod, preferably filled with a lubricant, and having a ball 9 at its lower end which is seated and turns in the socket 5, said ball having a lubricant hole therethrough by which lubricant is supplied to the socket. Slidably mounted on the upper portion of the piston is the ball member 10, of a universal joint, which is preferably hollow and filled with a lubricant, and 11, is the socket member of said joint in which said ball member is seated and turns, said socket member 11, being mounted on the frame 12 of a vehicle and provided with lubricating holes 13, and a lubricant cup 14. An air tight cylinder 15 is screwed into the upper portion of the ball member 10, of the universal joint and is closed at its upper end by means of a screw cap or cover 16.

The compressed air inlet pipe 17 is provided with a check valve, not shown, which may be of any well known form.

18, is a gage, which may also be of any well known form, by which the amount of pressure of the compressed air in the cylinder is indicated.

A plate 19 is mounted on the top of the piston rod and has a lug extending down into the piston rod and on top of this plate is mounted the piston 20, which is cup-shaped and made of thin resilient steel, or other similar material, with the inner surface of its sides 21, tapered as shown at 22, to a very thin edge 23, so that when liquid under pressure in the cylinder is forced therein the sides and edges will be expanded against the inner surface of the cylinder and thereby a perfectly air tight joint between the piston and the cylinder will be produced.

24, indicates oil which, preferably entirely fills the cup-shaped piston and a portion of the cylinder 15, the balance of the space above the oil being filled with compressed air.

The piston being made of a single piece of thin resilient material every part of the same will be affected and expanded when the air under pressure forces the oil into the same, and the edges being thinner than the body of the piston will be expanded to a greater degree than the said body and will contact so intimately with the inner surface of the cylinder that it will be impossible for any fluid to pass between said edge and the cylinder.

The piston may be spun, pressed or otherwise formed into the desired shape.

In the modified form of spring shown in Fig. 3 of the drawings, 1ª represents one end of an axle of a vehicle and 2ª, a wheel thereon. A sleeve 3ª, is rigidly secured to the axle and on top of said sleeve a bracket 4ª, is seated having a socket 5ª, provided with a cover 6ª, having a hole 7ª therethrough and packing 8ª, between said socket and cover. 9ª, is the cylinder having its lower end rounded or ball shaped, and seated in the socket 5ª. The piston in this instance is made much longer than the one shown in Fig. 1, and is inverted and fits closely within the cylinder 9ª, said piston comprising a hollow resilient tube 10ª, having its sides 11ª tapered, at the lower end portion thereof, as shown at 12ª, to a very thin edge 13ª, so that when liquid under pressure is forced therein said sides and edges will be expanded and provide an air and liquid tight joint between said piston and the cylinder. The upper end of the piston is closed by means of a screw cap or cover 14ª, which is provided with a rounded or ball shaped top 15ª, which is seated in a socket 16ª, formed in a bracket 17ª, extending upward from the frame 18ª, of a vehicle. A set screw 19ª, passes through a hole 20ª, in the bracket 17ª, and is screwed into a hole 20ᵇ in the rounded top 15ª. A groove 21ª, for lubricant is formed in the outer surface of the piston.

In the modified form of piston shown in Fig. 5, of the drawings 22ª, is the piston which is cup-shaped and made of resilient material, preferably steel, and has a rounded bottom 28ª, and sides 24ª, tapered as shown at 25ª, to a thin edge 26ª.

In use oil or some other comparatively incompressible fluid is first placed in the cylinder and the top or cover placed thereon, then air under pressure, or some other highly compressible fluid is introduced into the cylinder through the inlet pipe 17 as shown in Fig. 1 of the drawings. The oil being substantially incompressible the pressure caused by the upward movement of the piston, which in turn is caused by some obstacle in the road coming in contact with the wheels of the vehicle, is at once transmitted to the oil or other liquid and forces said oil into the piston and the piston being made of thin resilient material is thereby expanded and its edge being much thinner than the body thereof expands to a greater degree and makes a liquid and air tight joint between the inner surface of the piston and the cylinder. As soon as the excess of pressure is removed the elasticity of the air will restore the piston to its normal position. As the springs take up or compensate for all shocks, jolts, etc., transmitted to the vehicle solid rubber tires or any other kind may be used, thus obviating the use of pneumatic tires.

In the modified form of piston shown in Figs. 3 and 4 the compressed air is introduced through the hole 20ᵇ in the rounded top 15ª of the piston 10ª.

I do not desire to be understood as limiting myself to the specific details of construction and arrangement as herein described and illustrated, as it is manifest that variations and modifications may be made in the features of construction and arrangement on the adaptation of the device to various conditions of use without departing from the spirit and scope of my invention and improvements. I therefore reserve the right to all such variations and modifications as properly fall within the scope of my invention and the terms of the following claims.

What I claim is:—

1. A pneumatic spring for vehicles, comprising a cylinder, a cup shaped piston having substantially straight sides which are resilient throughout, substantially as described.

2. A pneumatic spring for vehicles, comprising a cylinder, a cup shaped piston the sides and bottom of which are continuous, and said sides being substantially straight and resilient throughout, substantially as described.

3. A pneumatic spring for vehicles, comprising a cylinder, a cup shaped piston having substantially vertical sides and substantially horizontal bottom which are continuous; said sides being resilient throughout their entire extent and having their edges of a greater degree of resiliency than the other portions thereof, substantially as described.

4. A pneumatic spring for vehicles, comprising a cylinder, a cup shaped resilient piston mounted loosely in said cylinder and having substantially vertical sides, said sides being resilient throughout their entire extent, substantially as described.

5. A pneumatic spring for vehicles, comprising a cylinder, a piston having sides which are resilient throughout their entire extent, and a piston rod provided with a plate on which said piston is mounted, said plate being mounted loosely on the top of said piston rod, substantially as described.

6. A pneumatic spring for vehicles, comprising a cylinder, an imperforate resilient cup shaped piston having substantially vertical sides which are resilient throughout their entire extent, substantially as described.

7. A pneumatic spring for vehicles, comprising a cylinder, designed to contain liquids under pressure, a piston rod provided with a plate, a resilient cup shaped piston mounted on but separate from said plate, said piston having its sides tapered to a thin edge, substantially as described.

8. A pneumatic spring for vehicles, comprising a cylinder containing liquid under pressure, a piston rod, a plate loosely seated on said piston rod, a hollow piston mounted loosely in said cylinder and held on said plate and in contact with the inner surface of said cylinder by means of the pressure of the said liquid under pressure, substantially as described.

9. A pneumatic spring for vehicles, comprising a hollow piston rod having a ball and socket joint at its lower end, a ball member of a universal joint slidably mounted on said piston rod, a socket in which said ball member is seated, a cylinder mounted in the top of the ball member, and a hollow resilient piston mounted on said piston rod in said cylinder, and means for expanding said piston against the inner surface of said cylinder to form a tight joint, substantially as described.

In testimony whereof I have signed my name in the presence of two subscribing witnesses.

RICHARD LIEBAU.

Witnesses:
ROBERT P. REID,
LANSING VAN AUKEN.

---

Correction in Letters Patent No. 1,046,091.

It is hereby certified that in Letters Patent No. 1,046,091, granted December 3, 1912, upon the application of Richard Liebau, of Watervliet, New York, for an improvement in "Pneumatic Springs for Vehicles," an error appears in the printed specification requiring correction as follows: Page 2, line 67, for the reference-numeral "28ᵃ" read *23ᵃ*; and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.* of a greater degree of resiliency than the other portions thereof, substantially as described.

4. A pneumatic spring for vehicles, comprising a cylinder, a cup shaped resilient piston mounted loosely in said cylinder and having substantially vertical sides, said sides being resilient throughout their entire extent, substantially as described.

5. A pneumatic spring for vehicles, comprising a cylinder, a piston having sides which are resilient throughout their entire extent, and a piston rod provided with a plate on which said piston is mounted, said plate being mounted loosely on the top of said piston rod, substantially as described.

6. A pneumatic spring for vehicles, comprising a cylinder, an imperforate resilient cup shaped piston having substantially vertical sides which are resilient throughout their entire extent, substantially as described.

7. A pneumatic spring for vehicles, comprising a cylinder, designed to contain liquids under pressure, a piston rod provided with a plate, a resilient cup shaped piston mounted on but separate from said plate, said piston having its sides tapered to a thin edge, substantially as described.

8. A pneumatic spring for vehicles, comprising a cylinder containing liquid under pressure, a piston rod, a plate loosely seated on said piston rod, a hollow piston mounted loosely in said cylinder and held on said plate and in contact with the inner surface of said cylinder by means of the pressure of the said liquid under pressure, substantially as described.

9. A pneumatic spring for vehicles, comprising a hollow piston rod having a ball and socket joint at its lower end, a ball member of a universal joint slidably mounted on said piston rod, a socket in which said ball member is seated, a cylinder mounted in the top of the ball member, and a hollow resilient piston mounted on said piston rod in said cylinder, and means for expanding said piston against the inner surface of said cylinder to form a tight joint, substantially as described.

In testimony whereof I have signed my name in the presence of two subscribing witnesses.

RICHARD LIEBAU.

Witnesses:
ROBERT P. REID,
LANSING VAN AUKEN.

---

Correction in Letters Patent No. 1,046,091.

It is hereby certified that in Letters Patent No. 1,046,091, granted December 3, 1912, upon the application of Richard Liebau, of Watervliet, New York, for an improvement in "Pneumatic Springs for Vehicles," an error appears in the printed specification requiring correction as follows: Page 2, line 67, for the reference-numeral "28ª" read *23ª*; and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.*

Correction in Letters Patent No. 1,046,091.

It is hereby certified that in Letters Patent No. 1,046,091, granted December 3, 1912, upon the application of Richard Liebau, of Watervliet, New York, for an improvement in "Pneumatic Springs for Vehicles," an error appears in the printed specification requiring correction as follows: Page 2, line 67, for the reference-numeral "28ª" read *23ª*; and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.*